United States Patent [19]

Lee et al.

[11] Patent Number: 5,166,795
[45] Date of Patent: Nov. 24, 1992

[54] VERTICAL PEAKING METHOD AND THE APPARATUS THEREOF

[75] Inventors: Jeong-sang Lee; Jong-sang Lim, both of Suwon, Rep. of Korea

[73] Assignee: Samsung Electronics Co., Ltd., Suwon, Rep. of Korea

[21] Appl. No.: 701,750

[22] Filed: May 17, 1991

[30] Foreign Application Priority Data

May 21, 1990 [KR] Rep. of Korea ............. 90-7301

[51] Int. Cl.$^5$ .............................................. H04N 5/57
[52] U.S. Cl. .................................................. 358/168
[58] Field of Search ............... 358/168, 169, 161, 184

[56] References Cited

U.S. PATENT DOCUMENTS

| | | |
|---|---|---|
| 4,679,087 | 7/1987 | Torrano, Jr. .................. 358/168 |
| 4,926,261 | 5/1990 | Matsumoto .................... 358/167 |
| 4,975,773 | 12/1990 | Rabii ............................ 358/168 |

Primary Examiner—Tommy P. Chin
Attorney, Agent, or Firm—Robert E. Bushnell

[57] ABSTRACT

A vertical peaking method and the apparatus thereof comprises the steps of selectively passing vertical and horizontal detail information by low-pass filtering a video signal to detect image brightness, subtracting the detected image brightness data signal from a maximum allowable value, and multiplying the signal obtained from the subtraction operation by the vertical peaking signal, adding it to the luminance signal to output the luminance signal vertically peaked according to image brightness. The apparatus accomplishes the steps via hardware, in which the amount of vertical peaking is controlled by the image brightness, so that the vertical peaking of an image is accomplished uniformly.

9 Claims, 6 Drawing Sheets

VERTICAL PEAKING METHOD AND THE APPARATUS THEREOF

BACKGROUND OF THE INVENTION

The present invention relates to an image peaking method and the apparatus thereof, and more particularly to a vertical peaking method and the apparatus thereof, for peaking the vertical contour of an image according to its brightness.

Generally, in a digital television for processing a composite video signal, several vertical peaking methods have been suggested and accordingly, the vertical resolution of the image has been improved.

An example of the conventional techniques is the Korean patent application No. 89-4463 entitled "vertical peaking method of a screen in a digital television" and filed on Apr. 4, 1989 by this applicant. In the specification and the drawings of the Korean patent application No. 89-4463, the specific constitution and the description of the operation are detailed. Consequently, only a brief description will be given here. In the conventional vertical peaking method, as shown in FIG. 1, a vertical transition component, i.e., a signal difference between the upper and lower lines of the representative scanning lines a, b, and c, is detected as shown in FIG. 3A and the frequency spectrum destribution of the vertical transition component is shown in FIG. 2 and includes oblique lines. When the vertical transition, i.e., a contour component of the vertical direction, is detected as shown in FIG. 3A, the detected signal is secondarily differentiated, thereby detecting a difference component between lines as shown in FIG. 3B. The detected difference component between lines is added to the vertical transition component signal to peak the vertical contour component as shown in FIG. 3C, thereby improving the vertical resolution.

But, the disadvantage of the aforementioned vertical peaking method is that the effect is nonlinear with respect to the image brightness. The magnitude of the difference component between lines as shown in FIG. 3 varies according to the level of the luminance signal which determines image brightness. That is, if the level of the luminance signal is low, the magnitude of the difference component between lines is small, and if the level of the luminance signal is high, the magnitude of the difference component between lines becomes larger.

Thus, as the image becomes darker, the magnitude of the difference component between lines becomes smaller. Accordingly, the vertical peaking on a dark screen is less effective than on a bright screen.

On the other hand, the Japanese patent laid-open publication no. "Sho 63-121382" shows the method which can provide a high resolution luminance signal having no cross-color phenomenon. But, to remove the cross-color phenomenon, the image contour signal is further peaked, so that generating an unnatural appearance of a thick line in the image contour.

SUMMARY OF THE INVENTION

Accordingly, it is an object of the present invention to provide a vertical peaking method and the apparatus thereof which uniformly peaks the vertical contour of the image even if the image brightness varies, by changing the vertical peaking degree according to the image brightness.

To achieve the object, the vertical peaking method of the present invention comprises the steps of:

selectively passing vertical and horizontal detail information by low-pass filtering a predeterminedly delayed video signal, to detect an image brightness data signal;

subtracting the detected image brightness data signal from a maximum allowable value;

controlling the gain of a signal by a subtraction operation and limiting the gain-controlled signal; and multiplying the gain-controlled and limited signal by a vertical peaking signal and then adding the multiplied signal to the luminance signal, thereby outputting the luminance signal vertically peaked according to image brightness.

Also, the apparatus for carrying out the vertical peaking method comprises:

a vertical low-pass filter for selectively passing vertical detail information by low-pass filtering a predeterminedly delayed video signal;

a horizontal low-pass filter for selectively passing horizontal detail information by low-pass filtering the output of the vertical low pass filter to detect an image brightness data signal;

a first adder for subtracting the data of image brightness detected in the horizontal low-pass filter from a maximum brightness value;

a first multiplier for gain-controlling the output of the first adder;

a limiter for limiting an output signal of the first multiplier;

a second multiplier for multiplying the output of the limiter by the vertical peaking signal; and a second adder for adding the output of the second multiplier to the luminance signal, in order to output the luminance signal vertically peaked according to image brightness.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Figure 1:
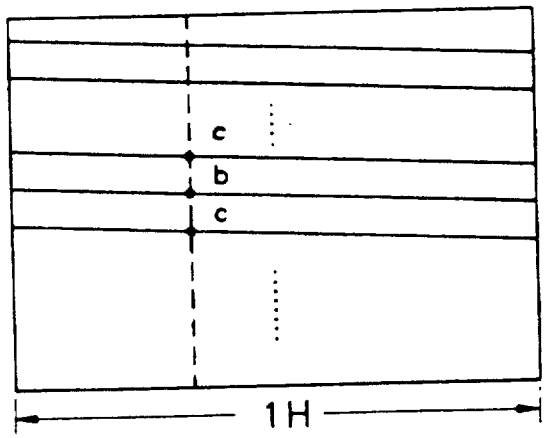
FIGS. 1, 2, and 3A through 3C are illustrations and graphs describing the vertical peaking method according to the prior art.
Figure 2:
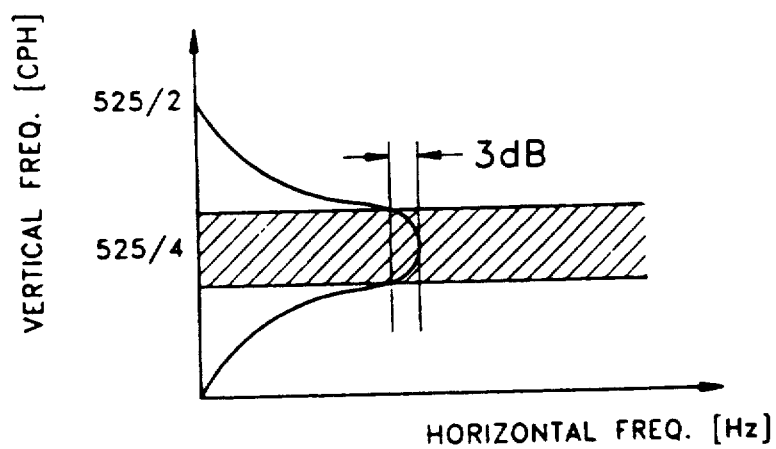
Figure 3A:
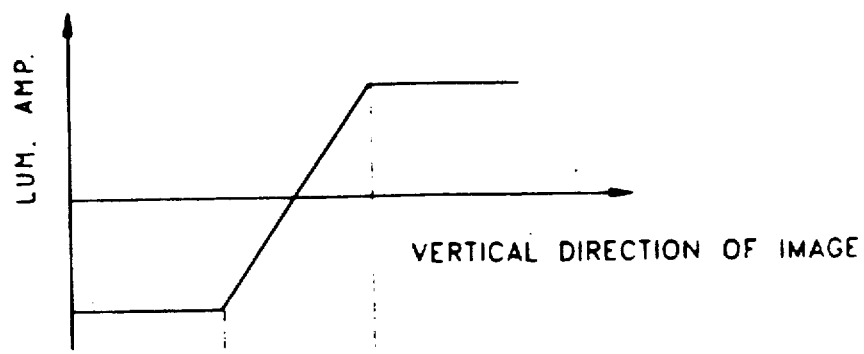
Figure 3B:
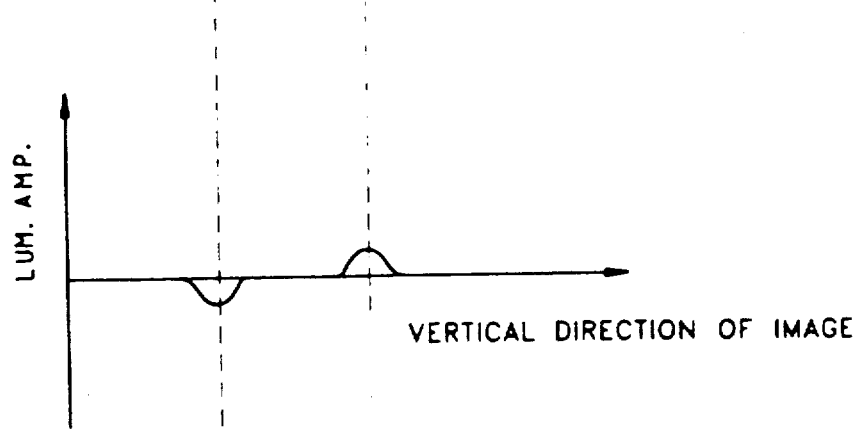
Figure 3C:
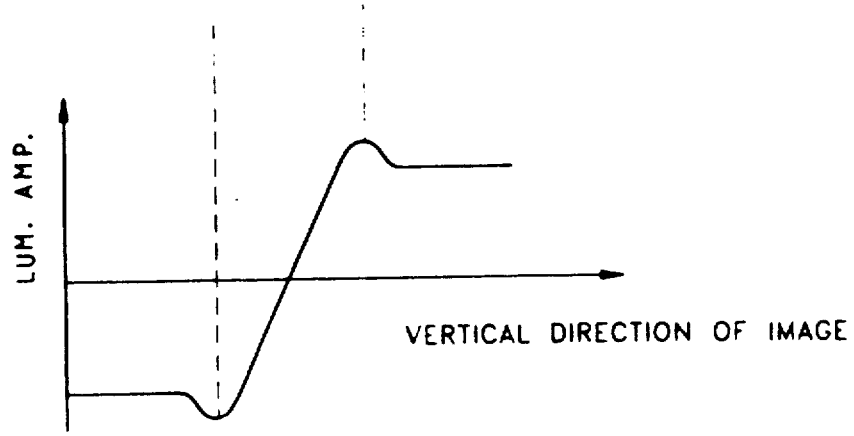
Figure 4:
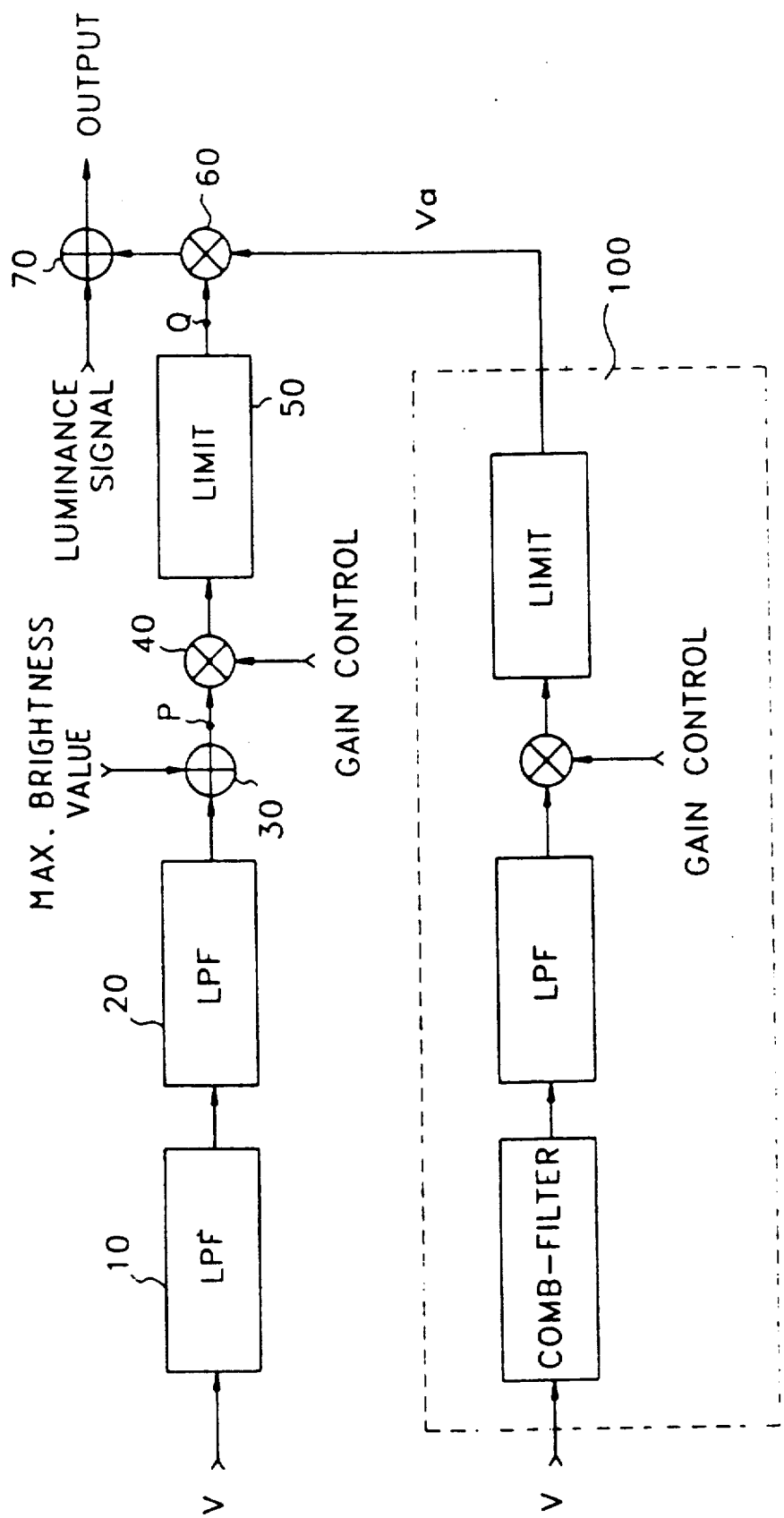
FIG. 4 is a block diagram showing an embodiment of the vertical peaking apparatus according to the present invention.

FIG. 4 is an embodiment of the vertical peaking apparatus according to the present invention, which comprises:

a vertical low-pass filter 10 for selectively passing vertical detail information by low-pass filtering a predeterminedly delayed video signal V;

a horizontal low-pass filter 20 for selectively passing horizontal detail information by low-pass filtering the output of the vertical low-pass filter 10 to detect a data signal of image brightness;

a first adder 30 for subtracting the image brightness data signal detected in the horizontal low-pass filter 20 from a maximum brightness value;

a first multiplier 40 for controlling the gain of the output from first adder 30;

a limiter 50 for limiting the output of the first multiplier 40;

a second multiplier 60 for multiplying the output of the limiter 50 by the vertical peaking signal Va; and a second adder 70 for adding the output of the second multiplier 60 and the luminance signal to output the luminance signal vertically peaked according to image brightness.

Figure 5:
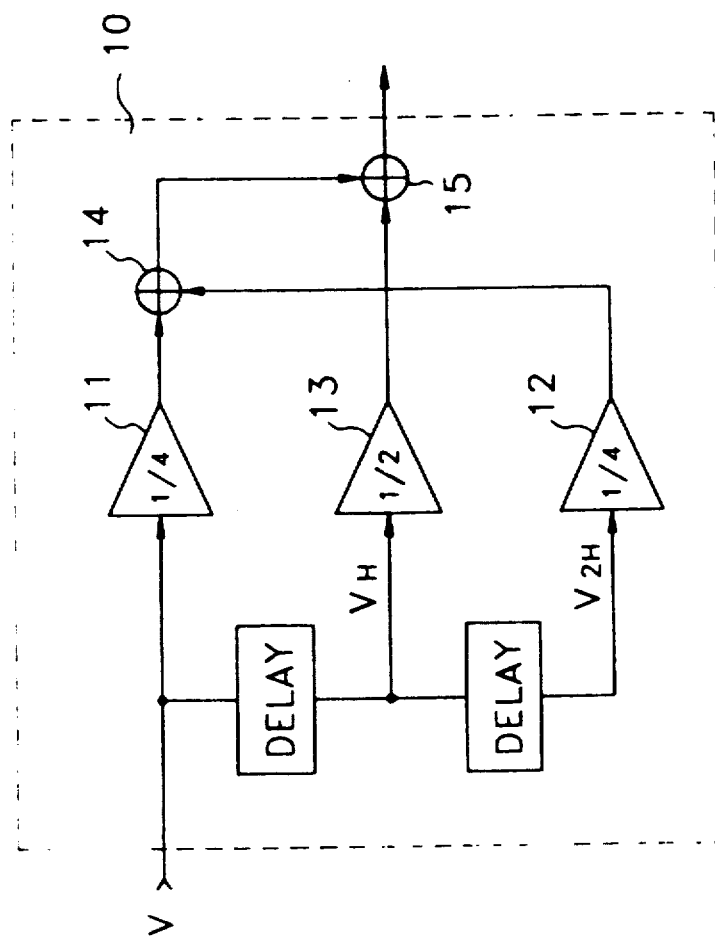
FIG. 5 is a block diagram showing an embodiment of a vertical low pass filter provided in the vertical peaking apparatus of FIG. 4.

FIG. 5 shows the detailed constitution of the embodiment of the vertical low-pass filter 10 provided in the apparatus of FIG. 4 for selectively passing vertical detail information by low-pass filtering an input signal.

Figure 6:
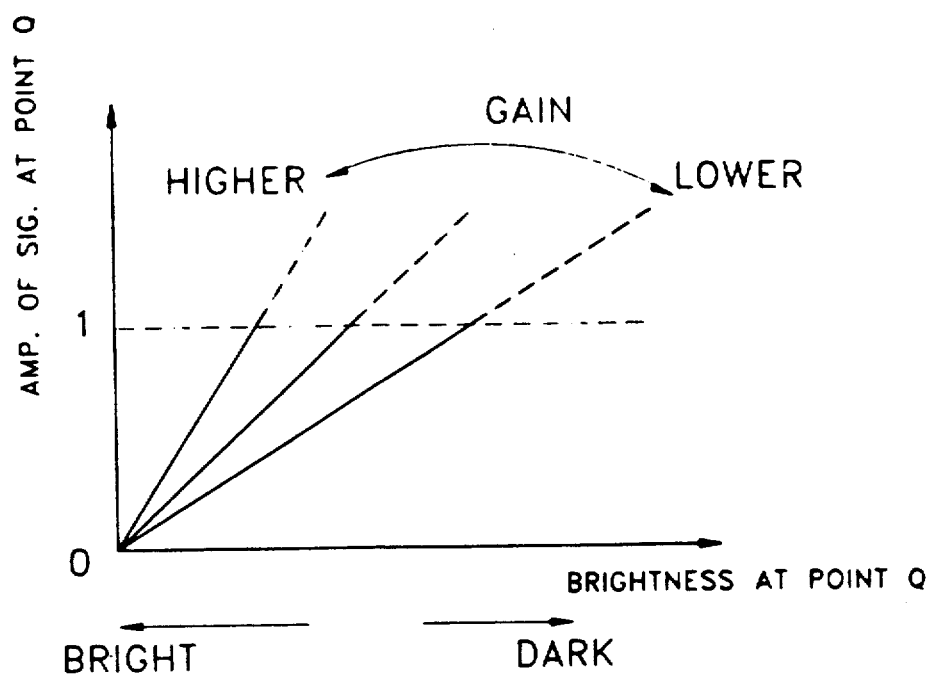
FIG. 6 is a graph showing vertical contour control according to image brightness in the vertical peaking apparatus of FIG. 4.

FIG. 6 shows the relationship between the image brightness data signal obtained at point P of FIG. 4 and the gain-controlled and limited signal obtained at point Q.

Figure 7:
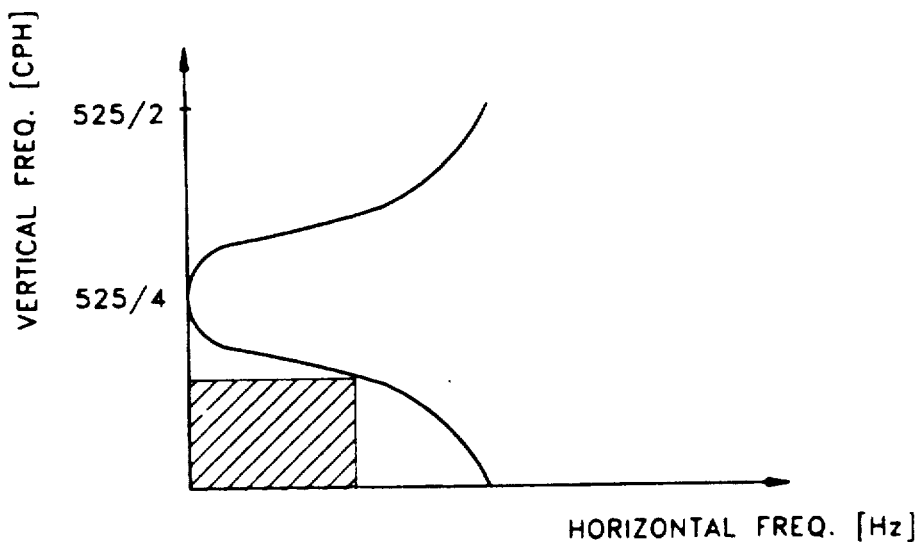
FIG. 7 is a graph showing the region on the spectrum which results from the selective passing of horizontal and vertical detail information in the low-pass filters in the vertical peaking apparatus of FIG. 4.

The oblique-lined portion of FIG. 7 maps the ideal spectral regions of a composite video signal after filtering by the vertical and horizontal low-pass filters.

Figure 8A:
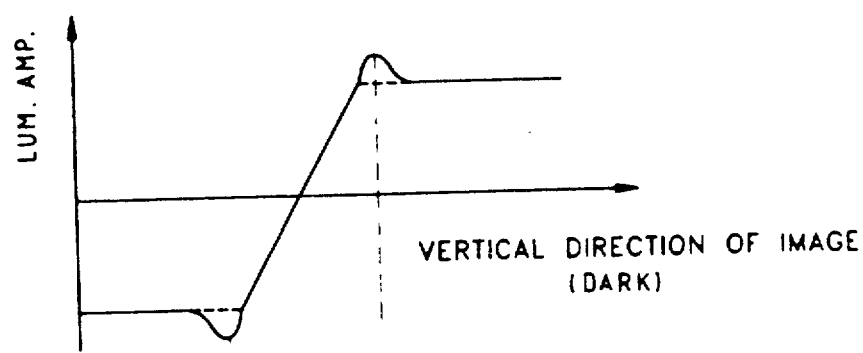
FIGS. 8A and 8B are graphs showing the peaking degree of a transition depending on image brightness in the vertical peaking apparatus of FIG. 4.
Figure 8B:
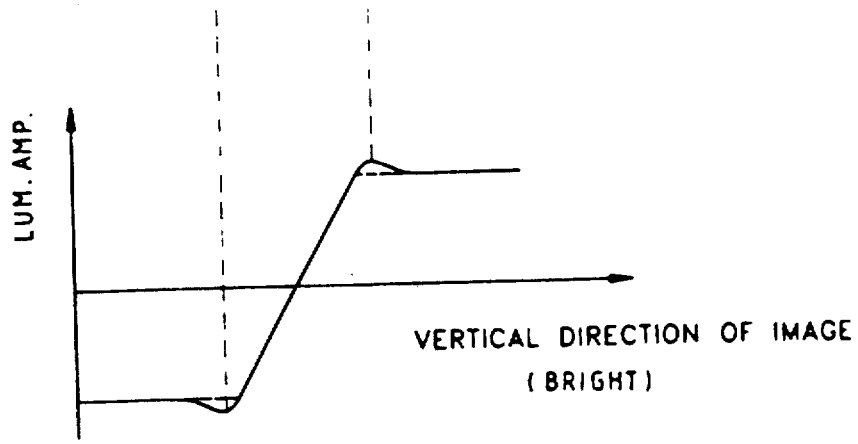

FIGS. 8A and 8B show the degree of transitional peaking according to image brightness where FIG. 8a exemplifies a dark screen and FIG. 8b exemplifies a bright screen. As the two drawings show, the degree of transitional peaking is relatively large for the dark screen as opposed to the bright screen. Here, the method for detecting the image brightness is to detect a direct current component of the composite video signal V. Accordingly, the vertical and horizontal detail information is separated from the composite video signal V to detect a low-band luminance signal, thereby detecting the image brightness. That is, the low frequency luminance signal obtained by the vertical and horizontal low-pass filters corresponds to the oblique-lined section in FIG. 7.

The vertical low-pass filter 10 shown in FIG. 5 comprises a first amplifier 11, a second amplifier 12, a third amplifier 13, a third adder 14, and a fourth adder 15, thereby separating the vertical information from a composite video signal V. The first amplifier 11 has a gain of 0.25 and effectively attenuates the normal composite video signal V to ¼ of its original amplitude and the second amplifier 12 also has a gain of 0.25 to effectively attenuate the 2H delayed composite video signal $V_{2H}$ to ¼ of its original amplitude, and the third amplifier 13 has a gain of 0.5 to effectively attenuate the 1H delayed composite video signal $V_H$ to ½ of its original amplitude. The third adder 14 sums the outputs of the first and second amplifiers 11 and 12, then transmits the result to the fourth adder 15 which adds the output signal of the third adder 14 to the output signal of the third amplifier 13. Thus, the vertical detail information is separated from the composite video signal V. The horizontal low-pass filter 20 of FIG. 4 separates the horizontal detail information from the output of the vertical low-pass filter 10 to detect an image brightness data signal. Here, the vertical low-pass filter 10 and the horizontal low-pass filter 20 must have a relatively narrow bandwidth of about 0.5 MHz, because the image brightness of a television corresponds to the DC component of the composite video signal. The region on a spectrum vertically and horizontally low-pass filtered in the vertical and horizontal low-pass filters 10 and 20 is shown in FIG. 7 by oblique lines.

The first adder 30 of FIG. 4 subtracts the data of image brightness outputted from the horizontal low-pass filter 20 from a maximum brightness value and then transmits the result to the first multiplier 40. At this time, when the amplitude of the data signal output from the horizontal low-pass filter 20 is low, i.e., the image is dark, the amplitude of the signal obtained at point P is high, so that the degree of peaking becomes larger in inverse proportion. In contrast, when the amplitude of the data signal is high, i.e., the image is bright, the signal obtained at point P is low, so that the degree of peaking becomes smaller in inverse proportion. Thus, even as the image brightness varies, the vertical contour is peaked uniformly.

The first multiplier 40 controls the gain of the output of the first adder 30 and transmits the gain-controlled signal to the limiter 50. The limiter 50 limits the amplitude of the output from first multiplier 40, so that vertical contour is not excessively peaked.

The gain control signal input to the first multiplier 40 controls the gain of the output from the first adder 30, thereby obtaining an optimum contour component. FIG. 6 shows the mutual relationship between the gain's increase and decrease by the gain control signal, the image brightness data signal obtained at point P, and the signal obtained at point Q via the limiter 50.

As shown in the drawing, as the image becomes brighter, the amplitude of the signal at point Q becomes smaller. It follows that as the image becomes darker, the amplitude of the signal at point Q becomes larger. Also, the relationship between the image brightness and signal amplitude at point Q varies according to gain.

That is, as shown in FIG. 6, the amplitude of the output signal of the limiter 50 detected at the point Q is limited from 0 to 1. Accordingly, as the image becomes darker, the amplitude of the signal at point Q is nearly "1", so that the vertical peaking signal Va is supplied to the second adder 70 without any attenuation, and as the image becomes brighter, the amplitude of the signal at point Q is nearly "0", so that the vertical peaking signal Va is hardly supplied to the second adder 70 and accordingly the amount of the vertical peaking becomes smaller.

The output of the limiter 50 is multiplied by the vertical peaking signal Va obtained by a conventional vertical peaking device 100 in the second multiplier 60. The second multiplier 60 multiplies its two input signals and then supplies the result to the second adder 70, which sums the multiplied signal and the luminance signal, to output the luminance signal vertically peaked according to image brightness.

As described above, according to the present invention, the vertical peaking degree is controlled according to the image brightness, so that the vertical peaking of an image is uniformly accomplished.

What is claimed is:

1. A vertical peaking method, comprising the steps of:

detecting an image brightness data representative of direct current components of a composite video signal by selectively low-pass filtering said composite video signal at predetermined bandwidths for separating vertical and horizontal detail information from said composite video signal to provide detected image brightness data;

subtracting said detected image brightness data from a maximum brightness value to provide a subtracted image brightness data;

multiplying said subtracted image brightness data with a vertical peaking signal to provide a multiplied signal; and adding said multiplied signal to a luminance signal to provide vertical peaking compensation to said luminance signal according to said image brightness data.

2. A vertical peaking method as claimed in claim 1, wherein the step of providing said multiplied signal further comprises the step of controlling gain of said subtracted image brightness data to provide a gain-controlled brightness data, and the step of limiting said gain-controlled brightness data at a predetermined level to provide gain compensation to said subtracted image brightness data prior to subtracting said image brightness data with said vertical peaking signal to provide said multiplied signal and then limiting said gain-controlled brightness data.

3. A vertical peaking apparatus, comprising:
a vertical low-pass filter for separating vertical detail information from a composite video signal;
a horizontal low-pass filter for separating horizontal detail information from the output of said vertical low-pass filter to detect an image brightness data;
a first adder for subtracting said image brightness data detected in said horizontal low-pass filter from a maximum brightness value;
a first multiplier for controlling the gain of the output of said first adder;
a limiter for limiting said gain-controlled brightness data at a predetermined level;
a second multiplier for multiplying the output of said limiter with a vertical peaking signal; and
a second adder for adding the output of said second multiplier to a luminance signal to maintain an uniform peak amplitude of said luminance signal according to said image brightness data.

4. A vertical peaking apparatus as claimed in claim 3, wherein said vertical low-pass filter comprises:
a first amplifier for effectively attenuating said composite video signal by a first amplification factor;
delay means for respectively delaying said composite video signal by one horizontal scanning line to provide a first delayed composite video signal, and two horizontal scanning lines to provide a second delayed composite video signal;
a second amplifier for effectively attenuating said second delayed composite video signal by a second amplification factor;
a third amplifier for effectively attenuating said first delayed composite video signal by a third amplification factor;
a first adder for adding the output signals of said first and second amplifiers; and
a second adder for adding the output of said first adder to the output of said third amplifier.

5. A vertical peaking apparatus as claimed in claim 4, wherein said first, second and third amplification factors are ¼, ¼, and ½ respectively.

6. A vertical peaking apparatus, comprising:
means for separating a luminance signal from a composite video signal;
filter means for separating vertical detail information and horizontal detail information from said composite video signal to detect an image brightness signal;
first adder means for subtracting said image brightness signal from a maximum brightness value to provide a subtracted brightness signal;
first multiplier means for controlling amplitude gains of said subtracted brightness signal to provide a gain-controlled brightness signal;
limiter means for limiting said gain-controlled brightness signal at a predetermined level to provide a limited brightness signal;
second multiplier means for multiplying said limited brightness signal with a vertical peaking signal to provide peak compensated signal; and
second adder means for adding said compensated signal to said luminance signal to maintain an uniform peak amplitude level of said luminance signal.

7. The vertical peaking apparatus as claimed in claim 6, wherein said filter means comprises a vertical low-pass filter for low-pass filtering said composite video signal at a first predetermined bandwidth to detect said vertical detail information data, and a horizontal low-pass filter for low-pass filtering said vertical detail information data at a second predetermined bandwidth to detect said image brightness signal.

8. The vertical peaking apparatus as claimed in claim 7, wherein said vertical low-pass filter comprises:
a first amplifier for effectively attenuating said composite video signal by a first amplification factor;
delay means for respectively delaying said composite video signal by one horizontal scanning line to provide a first delayed composite video signal, and two horizontal scanning lines to provide a second delayed composite video signal;
a second amplifier for effectively attenuating said second delayed composite video signal by a second amplification factor;
a third amplifier for effectively attenuating said first delayed composite video signal by a third amplification factor;
a first adder for adding the output signals of said first and second amplifiers; and
a second adder for adding the output of said first adder to the output of said third amplifier to provide said vertical detail information data.

9. The vertical peaking apparatus as claimed in claim 8, wherein said first, second and third amplification factors are ¼, ¼, and ½ respectively.

* * * * *

UNITED STATES PATENT AND TRADEMARK OFFICE
CERTIFICATE OF CORRECTION

PATENT NO. : 5,166,795
DATED : November 24, 1992
INVENTOR(S) : Jeong-Sang Lee, et al.

It is certified that error appears in the above-indentified patent and that said Letters Patent is hereby corrected as shown below:

Column 1, line 27, after "spectrum", change "destribution" to

--distribution--;

Signed and Sealed this

First Day of October, 1996

Attest:

BRUCE LEHMAN

*Attesting Officer*  *Commissioner of Patents and Trademarks*